(12) United States Patent
Latham et al.

(10) Patent No.: US 11,115,084 B2
(45) Date of Patent: Sep. 7, 2021

(54) ISOLATED DATA TRANSFER SYSTEM

(71) Applicants: Allegro MicroSystems, LLC, Manchester, NH (US); Commissariat à l'énergie atomique et aux énergies alternatives, Paris (FR)

(72) Inventors: Alexander Latham, Harvard, MA (US); Claude Fermon, Orsay (FR); Myriam Pannetier-Lecoeur, Bures sur Yvette (FR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/200,799

(22) Filed: Nov. 27, 2018

(65) Prior Publication Data

US 2020/0169299 A1 May 28, 2020

(51) Int. Cl.
*H04B 5/00* (2006.01)
(52) U.S. Cl.
CPC ......... *H04B 5/0093* (2013.01); *H04B 5/0031* (2013.01)
(58) Field of Classification Search
CPC ......... H04W 4/80; H04B 5/0075; H04B 5/81; H04B 5/87; H04B 5/93
See application file for complete search history.

(56) References Cited

U.S. PATENT DOCUMENTS

| | | | | |
|---|---|---|---|---|
| 5,764,052 A | * | 6/1998 | Renger | G01R 33/028 324/253 |
| 5,831,426 A | * | 11/1998 | Black, Jr. | G01R 15/205 324/127 |
| 7,511,483 B2 | | 3/2009 | Pannetier et al. | |
| 10,074,939 B1 | | 9/2018 | Briano | |
| 2003/0042571 A1 | * | 3/2003 | Chen | H01F 17/0006 257/531 |
| 2007/0216408 A1 | * | 9/2007 | Ando | G01R 29/0878 324/258 |
| 2009/0026266 A1 | * | 1/2009 | Raggam | G06K 7/0008 235/439 |
| 2009/0218657 A1 | * | 9/2009 | Rofougaran | H04B 5/02 257/531 |
| 2013/0055052 A1 | | 2/2013 | Kaeriyama | |

(Continued)

FOREIGN PATENT DOCUMENTS

EP 3 293 889 A1 3/2018

OTHER PUBLICATIONS

Analog Devices, "5.0 kV rms Quad Digital Isolators;" Data Sheet ADuM240D/ADuM240E/ADuM241D/ADuM241E/ADuM242D/ADuM242E; Retrieved from www.analog.com; Jan. 2016; 26 Pages.

(Continued)

*Primary Examiner* — Wen W Huang
(74) *Attorney, Agent, or Firm* — Daly, Crowley, Mofford & Durkee, LLP (57) ABSTRACT

Methods and apparatus for providing data transfer with a drive coil to transmit information, a receive coil magnetically coupled to the drive coil, and a first magnetoresistive sensor proximate the receive coil to detect information from the receive coil. In embodiments, the drive and receive coils are separated by an isolation material. In embodiments, a signal isolator IC packages includes transmit and receive coils and a magnetic field sensing element coupled to the receive coil.

29 Claims, 11 Drawing Sheets

(56) References Cited

U.S. PATENT DOCUMENTS

| | | | | |
|---|---|---|---|---|
| 2013/0241543 A1* | 9/2013 | Stenson | ............... | G01R 33/096 |
| | | | | 324/252 |
| 2014/0353785 A1* | 12/2014 | Paci | ........................ | H01L 27/22 |
| | | | | 257/427 |
| 2015/0084972 A1* | 3/2015 | Wu | ...................... | G09G 3/2096 |
| | | | | 345/520 |
| 2016/0149416 A1* | 5/2016 | Ha | .......................... | H02J 7/025 |
| | | | | 307/104 |
| 2016/0164463 A1* | 6/2016 | Zhou | ........................ | H03D 7/00 |
| | | | | 324/226 |

OTHER PUBLICATIONS

NVE Corporation, "High Speed Digital Isolators;" IL710; Rev. AE; Retrieved from www.IsoLoop.com; Nov. 2016; 14 Pages.

Daughton, "Spin-Dependent Sensors;" Invited Paper, Proceedings of the IEEE, vol. 91, No. 5; May 2003; pp. 681-686; 6 Pages.

PCT International Search Report and Written Opinion dated Dec. 12, 2019 for International Application No. PCT/US2019/053054; 14 Pages.

* cited by examiner

ISOLATED DATA TRANSFER SYSTEM

BACKGROUND

Signal isolators can be used to transfer information across a barrier that may separate first and second die or portions of a die. For example, optocouplers can include a LED that emits light through an optically transparent insulating film (or dielectric) and strikes a photo detector that generates a current flow that corresponds to the emitted light. RF carriers can also be used to transmit information through a barrier separating die in different voltage domains.

SUMMARY

The present invention provides method and apparatus for magnetically transferring information while maintaining voltage isolation, such as for signal isolators. In embodiments, a signal isolator includes first and second coils separated by an isolation layer and a magnetic field sensing element to detect the transferred information on the second coil. In embodiments, the magnetic field sensing element can include one or more magnetoresistance elements.

In some embodiments, the first coil, which can transmit information, may have more turns than the second coil, which can receive the transmitted information. In one particular embodiment, the second (receive) coil, near which the magnetic field sensing element is located, has one turn, i.e., N=1, in order to have as much current in the second coil as possible to maximize signal pick up.

In example embodiments, the second coil has one or more regions in a single turn that are more narrow than the rest of the coil in order to concentrate the generated magnetic field on the magnetic field sensing element. It will be appreciated that there is a trade-off since the narrower region lowers the current level in the coil due to additional inductance and resistance. In embodiments, the one or more narrower regions should be arranged such that one can sense the current in the coil differentially to enhance rejection of stray fields.

In some embodiments, further reduction of stray fields can be achieved by using more than one coil/isolation/coil/sensor structure. For example, first and second such structures can be run 180 degrees out of phase to facilitate subtraction of stray fields. In an alternative embodiment, stray field reduction can be achieved by using a split toroid type coil structure, which may also reduce signal emissions.

In some embodiments, the second coil in the stack up can be coupled to ground at the same reference as the magnetic field sensor(s), as the signals being transferred are AC. This may effectively shield the magnetic field sensor(s), so that transient voltage changes across the isolation layer do not result in disturbances in the sensor outputs.

In one aspect, a system comprises: a drive coil to transmit information; a receive coil magnetically coupled to the drive coil for receiving the information from the drive coil; and a first magnetic field sensing element proximate the receive coil to detect the information from the receive coil.

A system can further include one or more of the following features: the receive coil includes a first narrowed portion to increase current for concentrating magnetic field generated by the current through the receive coil on the first magnetic field sensing element, a second magnetic field sensing element, wherein the receive coil includes a second narrowed portion, wherein the second magnetic field sensing element is proximate the second narrowed portion, the first and second narrowed regions are located for coupling to the first and second magnetic field sensing elements differentially, which has a bridge configuration, the first narrowed portion is located outside of an area of the drive coil, a die to support the first magnetic field sensing element, the die supports the drive and receive coils, the die includes circuitry to process information from the first magnetic field sensing element, the receive coil has one turn, the receive coil has less than five turns, the drive coil includes first and second coils coupled in series, the receive coil is connected to ground, the first magnetic field sensing element comprises a GMR element, the first magnetic field sensing element comprises a TMR element, the drive coil is isolated from the receive coil and the magnetic field sensing element, and/or the isolation comprises electrical and/or galvanic isolation.

In another aspect, a signal isolator IC package comprises: a drive coil to transmit information; a receive coil magnetically coupled to the drive coil for receiving the information from the drive coil; and a first magnetic field sensing element proximate the receive coil to detect the information from the receive coil.

An IC package can further include one or more of the following features: isolation between the drive coil and receive coil, the receive coil includes a first narrowed portion to increase current for concentrating magnetic field generated by the current through the receive coil on the first magnetic field sensing element, a second magnetic field sensing element, wherein the receive coil includes a second narrowed portion, wherein the second magnetic field sensing element is proximate the second narrowed portion, the first and second narrowed portions are located for coupling to the first magnetic field sensing element, which has a bridge configuration, the first narrowed portion is located outside of an area of the drive coil, a die to support the first magnetic field sensing element, a transistor bridge coupled to the drive coil, first and second die separated by a barrier region, the transistor bridge is disposed on the first die and the drive and receive coils are disposed on the second die, the first magnetic field sensing element sensor is disposed on the second die, and/or the transistor bridge is coupled to a first input pin and the first magnetic field sensing element is coupled to a first output pin.

In a further aspect, a method comprises: employing a drive coil to transmit information; employing a receive coil magnetically coupled to the drive coil for receiving the information from the drive coil; and employing a first magnetic field sensing element proximate the receive coil to detect the information from the receive coil.

A method can further include one or more of the following features: the receive coil includes a first narrowed portion to increase current for concentrating magnetic field generated by the current through the receive coil on the first magnetic field sensing element, a second magnetic field sensing element, wherein the receive coil includes a second narrowed portion, wherein the second magnetic field sensing element is proximate the second narrowed portion, the first and second narrowed regions are located for coupling to the first and second magnetic field sensing elements differentially, which has a bridge configuration, the first narrowed portion is located outside of an area of the drive coil, a die to support the first magnetic field sensing element, the die supports the drive and receive coils, the die includes circuitry to process information from the first magnetic field sensing element, the receive coil has one turn, the receive coil has less than five turns, the drive coil includes first and second coils coupled in series, the receive coil is connected to ground, the first magnetic field sensing element comprises a GMR element, the first magnetic field sensing element comprises a TMR element, the drive coil is isolated from the receive coil and the magnetic field sensing element, and/or the isolation comprises electrical and/or galvanic isolation.

BRIEF DESCRIPTION OF THE DRAWINGS

The foregoing features of this invention, as well as the invention itself, may be more fully understood from the following description of the drawings in which.

DETAILED DESCRIPTION

Figure 1:
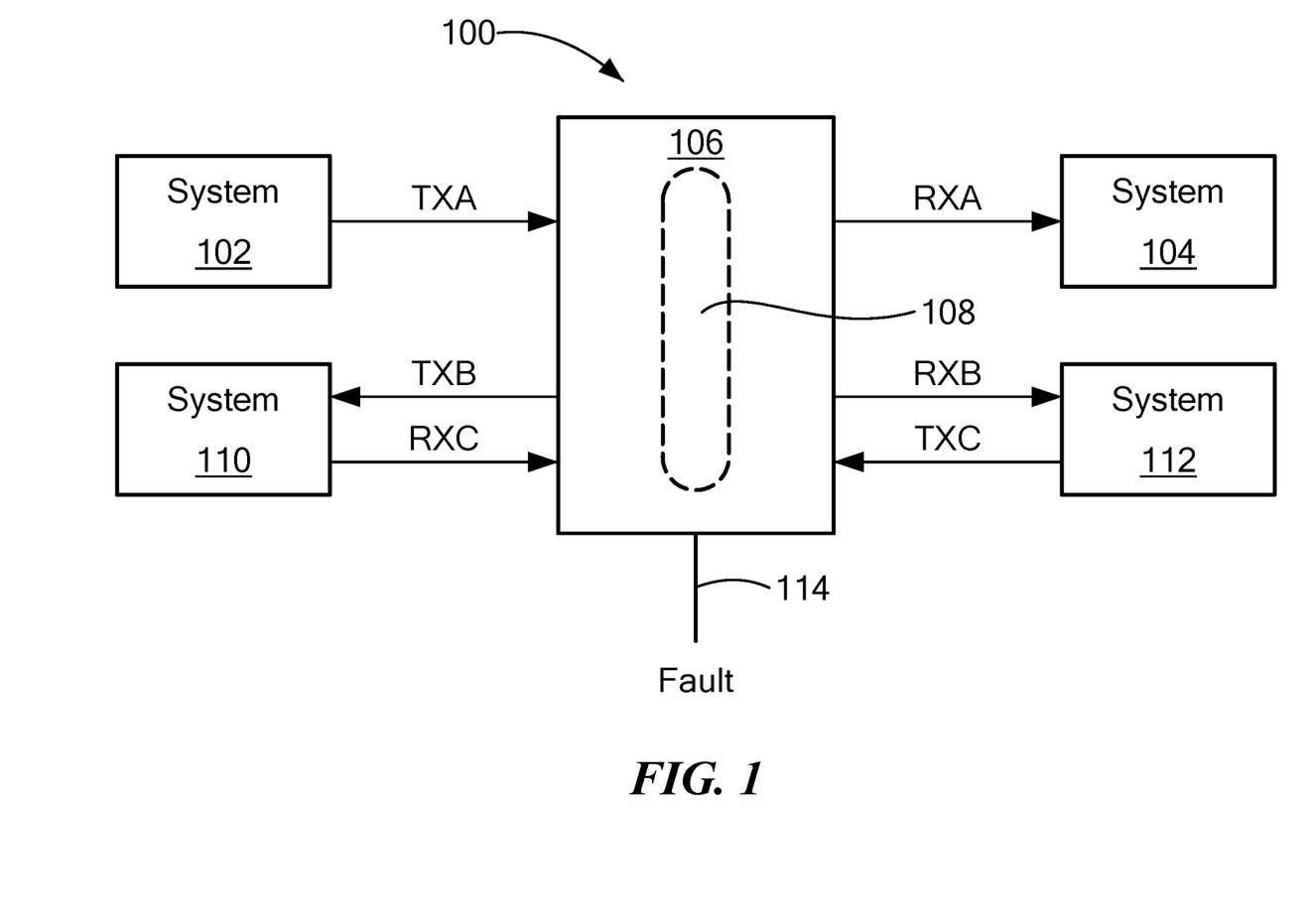
FIG. 1 is a schematic representation of a signal isolator having magnetic data transfer in accordance with example embodiments of the invention.

FIG. 1 shows an example system 100 including a first system 102 coupled to a second system 104 via a signal isolator 106 with communication having magnetic data transfer in accordance with illustrative embodiments. In embodiments, the signal isolator 106 is provided as an integrated circuit with an isolation barrier 108 across which signals transmitted by the first system 102 are sent to the second system 104 a physical connection. In embodiments, the first and second systems 102, 104 may operate at different voltage levels.

In embodiments, a third system 110 and a fourth system 112 communicate via the signal isolator 106 through a first channel over which the third system 110 transmits data to the fourth system 112 and a second channel over which the fourth system transmit data to the third system. The first channel includes a TXB input to the isolator 106 and a RXB output to the fourth system 104. The second channel includes a TXC input to the isolator 106 and a RXC output to the third system 110.

Figure 2A:
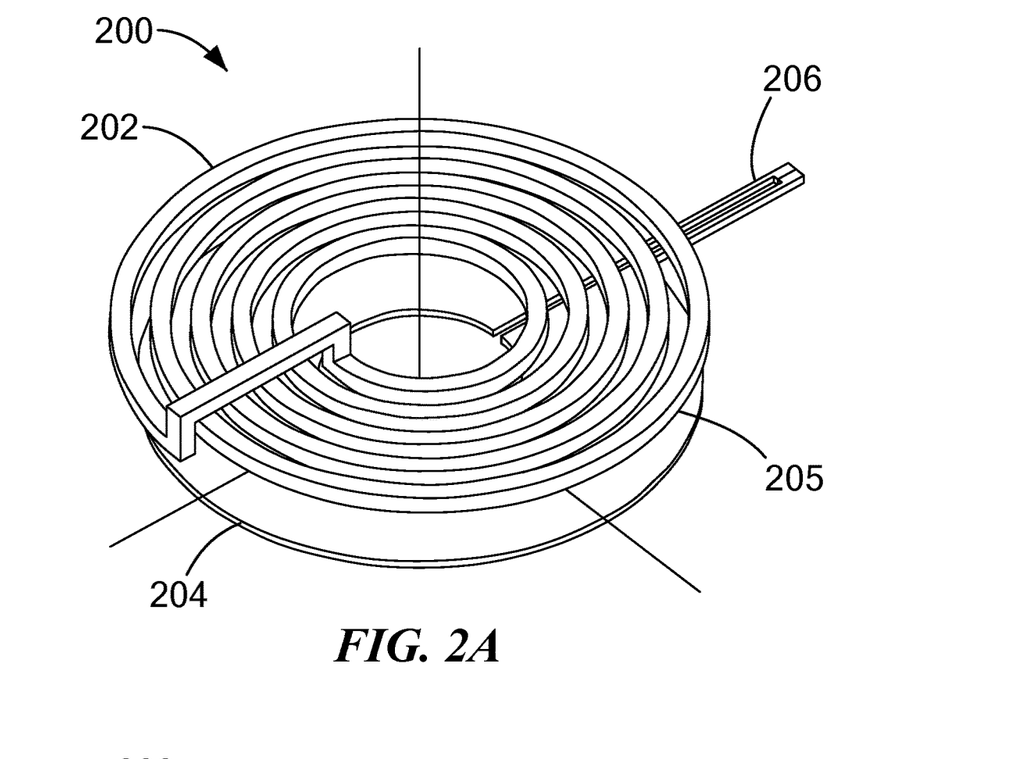
FIGS. 2A and 2B show an example transmitter coil-isolator-receiver coil structure with the receiver coil having a narrowed region.
Figure 2B:
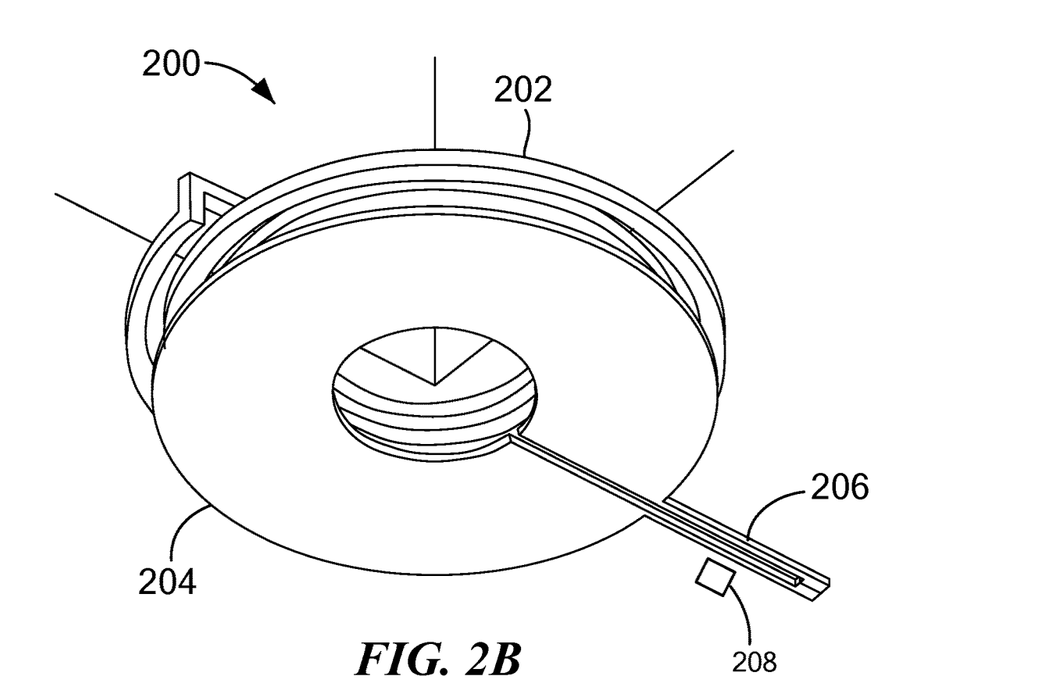

FIGS. 2A and 2B show an example data transfer structure 200 having a first coil 202 for transmitting data signals and a second coil 204 for receiving the data transmitted by the first coil. An insulator material 205 is disposed between the first and second coils 202, 204.

Figure 3A:
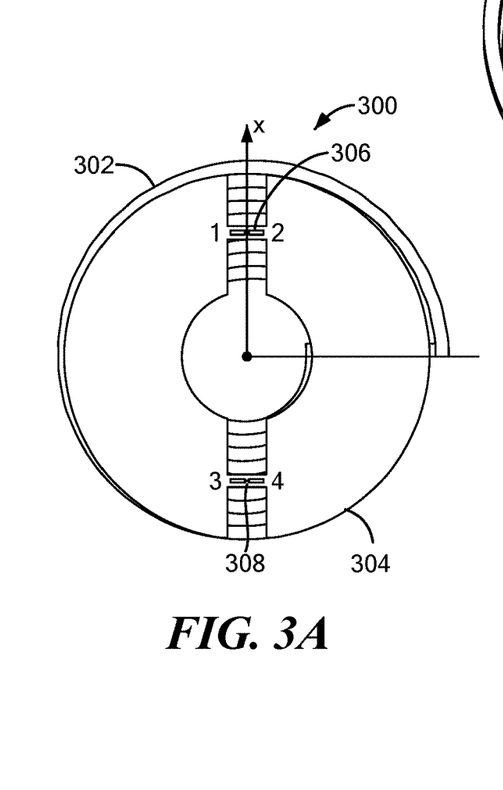
FIGS. 3A-3C shows a further example transmitter coil-isolator-receiver coil structure with the receiver coil having a narrowed region.
Figure 3B:
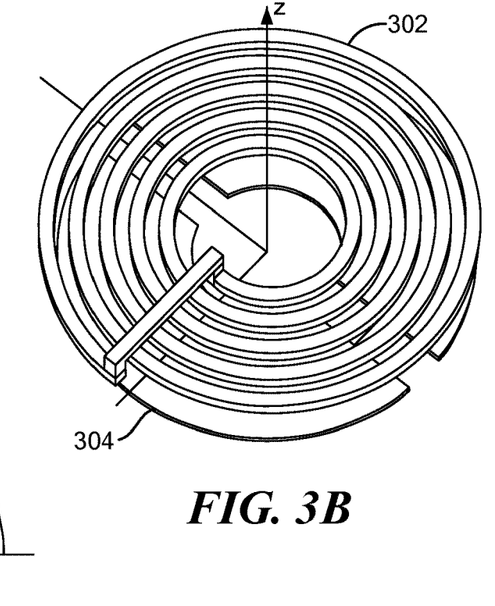
Figure 3C:
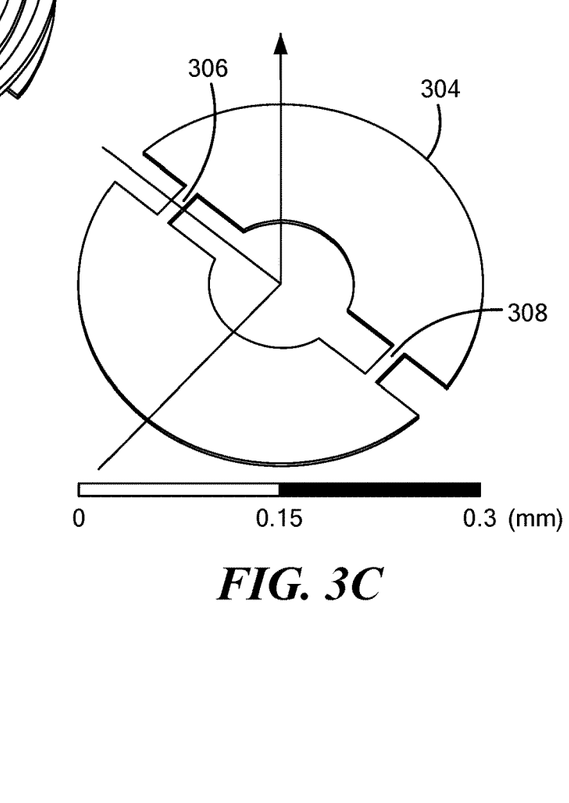
Figure 3D:
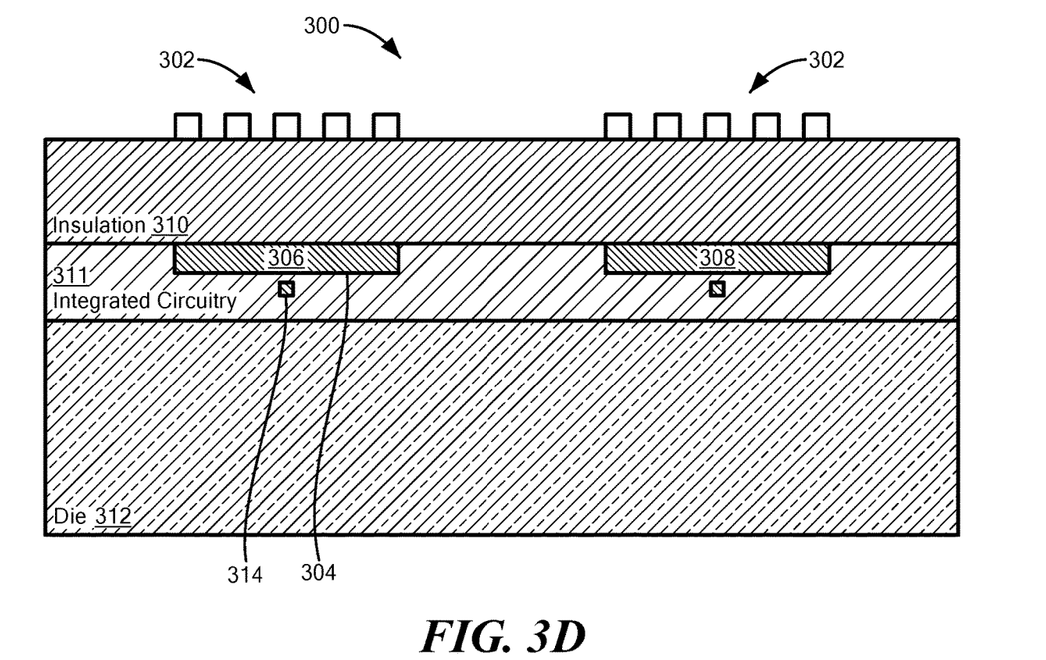
FIG. 3D is a representation of a cross sectional view of FIG. 3A showing a signal isolator having magnetic data transfer.

In embodiments, the first coil 202 has more turns than the second coil 204 and the second coil has a narrowed region 206, which concentrates a magnetic field generated by a current flow through the second coil. A magnetic field sensing element 208 is located in proximity to the narrowed region 206 of the second coil 204 to pick up the generated field. In an example embodiment, the narrowed region 206 is outside the area of the remainder of the second coil 204. An advantage provided by embodiments of the invention includes placing the sensing elements away from the transmit coil, which helps with reducing capacitive coupling, which creates noise. In embodiments, the pick-up coil grounded, as shown in FIG. 3A.

As used herein, a narrowed region outside the area of the coil refers to the narrowed region being external to an outermost coil or coil portion. In other words, the narrowed region does not overlap with the coil.

In embodiments, the second (receive) coil 204 comprises a narrowed region 206 formed from a relatively small strip-line short that concentrates the current in the coil over the magnetic field sensing element 208. It is understood any practical number of magnetic field sensing elements can be placed in suitable locations for sensing the magnetic field generated by the second coil 204 at or near the narrowed region 206 and/or other places.

The coil-insulator-coil structure 200 focuses energy from the first coil 202 onto the magnetic field sensing element 208. The number of turns and turns ratio (N) of the first to second coils 202, 204 can be provided in any practical value to meet the needs of a particular application. In example embodiments, the first coil 202 has more turns than the second coil 204, in order to drive coil 202 with as little current as possible and have as much current as possible in coil 204.

FIGS. 3A-3D show a further embodiment of a structure 300 having first and second coils 302, 304, where the second (receive) coil has first and second narrowed regions 306, 308 to increase signal pickup for a magnetic field sensing element. The narrowed regions 306, 308 connect first and second 'halves' of the second coil 304 to create shorter narrowed regions for the sensing elements to go under versus the configurations shown in FIGS. 2A and 2B. It is understood that the narrowed regions increase the impedance of the coil, reducing the current flow.

It is understood that the width/size of the narrowed regions 306, 308 impacts the magnitude of the field seen by the magnetic field sensing element. An insulator layer 310 (FIG. 3D) is disposed between the first and second coils 302, 304. In an example embodiment, an active layer 311 of a die 312 can support the coil structure 300 and include one or more magnetic field sensing elements 314, such as magnetoresistance elements. The die 312 can include an active layer to support circuitry for processing the information from the magnetic field sensing element, as well as encoding/decoding, amplifying, filtering, and the like.

Figure 3E:
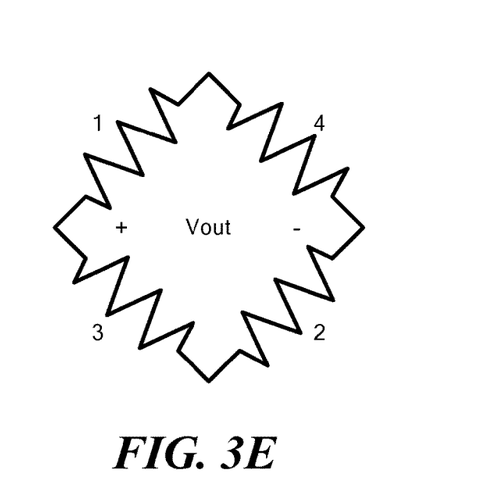
FIG. 3E is a schematic representation of an example magnetic field sensing element for use with the transmitter coil-isolator-receiver coil structure of FIG. 3A.

The magnetic field on elements 1 and 2 in FIG. 3A is 180 degrees out of phase with the magnetic field on elements 3 and 4 in FIG. 3A. FIG. 3E shows a sensing element bridge having sensing elements located in relation to 1,2,3,4 in FIG. 3A to generate a differential output. It is understood that magnetic field sensors having bridge configurations are well known in the art.

Figure 4A:
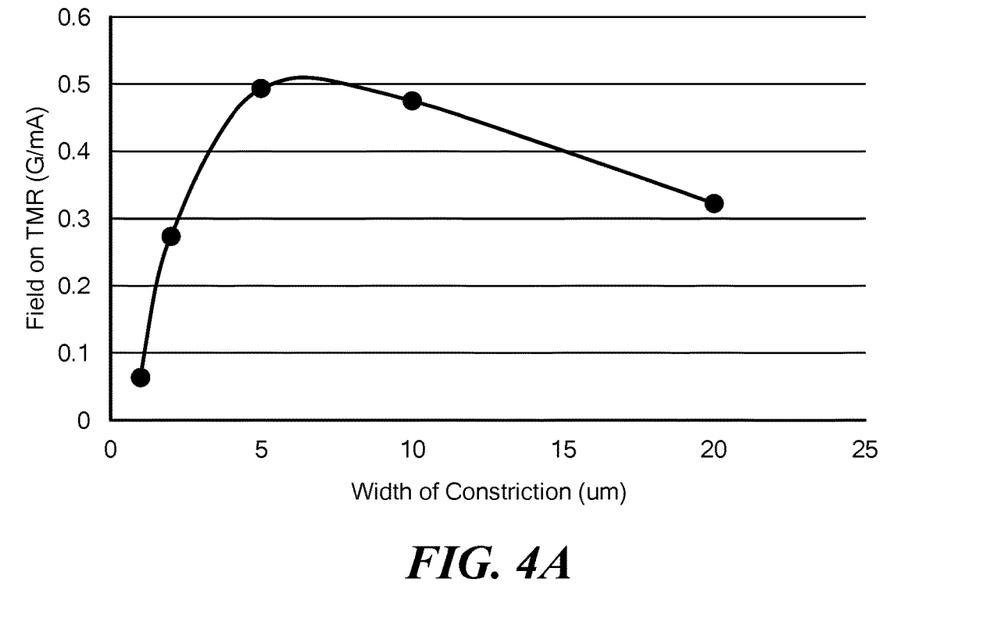
FIG. 4A is a graphical representation of a field seen on a magnetic field sensing element versus a width of narrowed region of a receive coil.
Figure 4B:
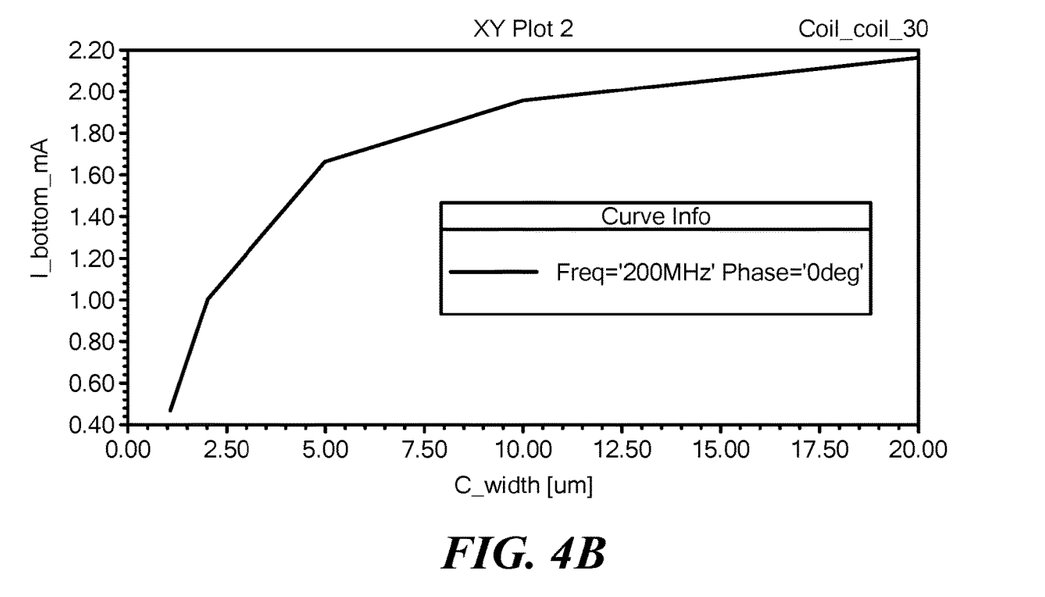
FIG. 4B is an example graphical representation of a current through a receive coil versus a width of narrowed region of a receive coil.

FIG. 4A shows a plot of width of the narrowed regions 306, 308 versus the magnetic field seen by a magnetic field sensor about 2.5 μm below the narrowed regions. In an example embodiment, the first and second narrowed regions 306,308 have a length of about 30 μm. As can be seen, the coupling of the sensing element has a maximum of about 0.5 G/mA for a narrowed region width of about 6 μm. FIG. 4B shows the width of the narrowed region (x-axis) versus current through the coil (y-axis). As can be seen, an increase in width of the narrowed regions results in an increase in current level though the coil that generally levels off.

As can be seen, the narrowed regions 306, 308, concentrate the magnetic field reduce the current in the receive coil while adding resistance to the path. There is an optimum size of the concentrating path to get the greatest amount of field on the sensor. Example sensors include TMR, GMR, and the like.

It is understood that the narrowed region(s) can have any geometry that results in less cross-sectional area of material than in a non-narrowed region of the coil. The coil/narrowed region can be flat, round, eccentric, and the like and the coil and narrowed region may have different shapes. It is further understood that one or more narrowed regions of the receive coil can form any practical portion of the receive coil to meet the needs of a particular application. In addition, the coils can have any practical shape, geometry, volume, turn ratio, etc., to meet the needs of a particular application.

Figure 5A:
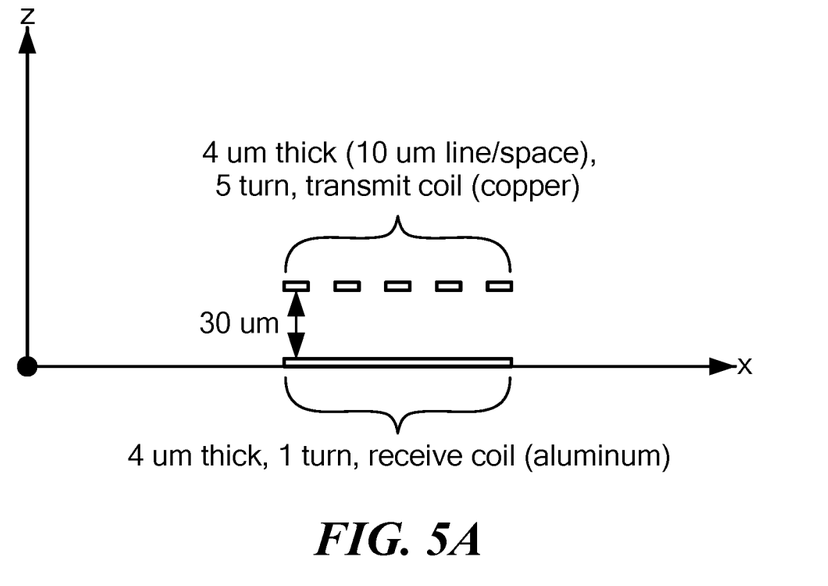
FIG. 5A is a schematic representation of an example transmit coil and receive coil configuration.

FIG. 5A shows an example structure including a transmit coil having 5 turns with 1 mA flowing and a receive coil having a single turn, where the transmit and receive coils are spaced 30 μm apart. The transmit coil, which comprises copper, is 10 μm wide with 10 μm spacing. The receive coil comprises aluminum 4 μm thick. Coupling between the receive coil and a magnetic field sensing element is based on the total current in receive coil being in a strip line over the magnetic field sensing element.

Figure 5B:
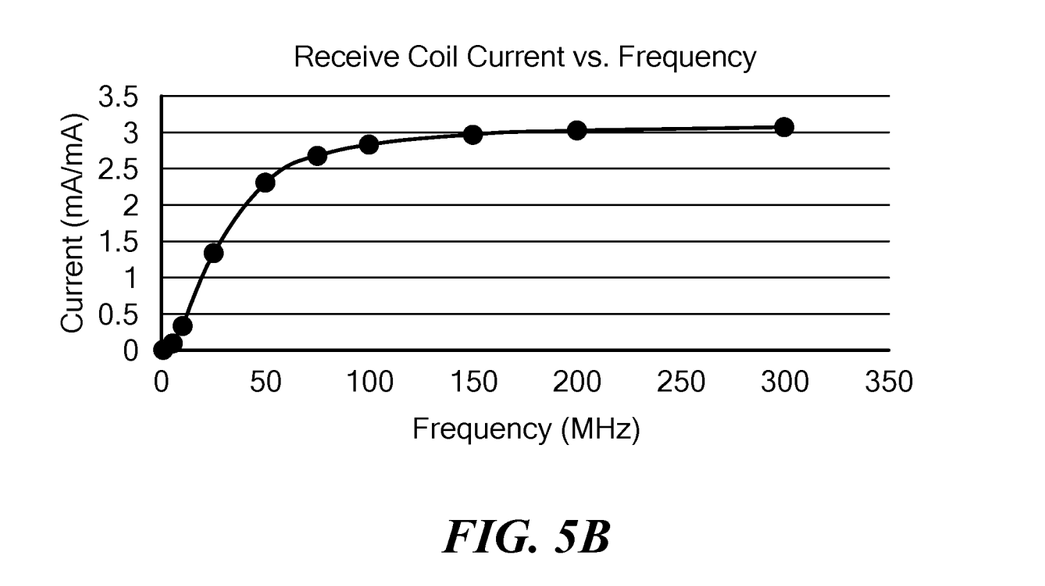
FIG. 5B is an example graphical representation of receive coil current versus frequency.

As can be seen in FIG. 5B, at 100 MHz, there is about 3 mA in the receive coil for 1 mA in the transmit coil (60% efficiency). In this example, the magnetic field sensing element sits about 2.5 um below the receive coil and sees about 0.8 G/mA in the receive coil. The total coupling factor is about 2.4 G/mA in the transmit coil, which is a factor of three.

Figure 6A:
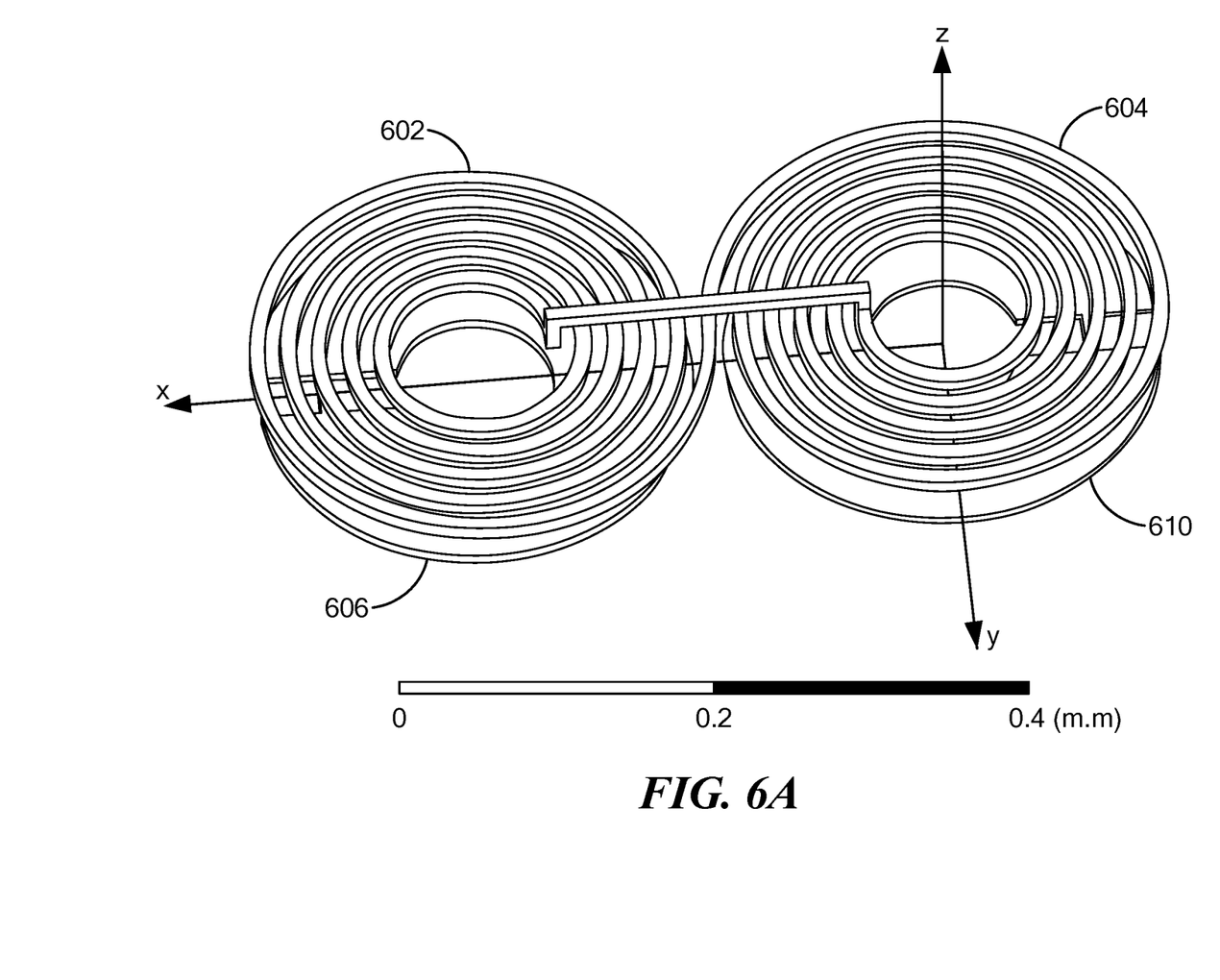
FIGS. 6A and 6B show a schematic representation of a multi-coil transmit coil and multi-coil receive coil configuration.
Figure 6B:
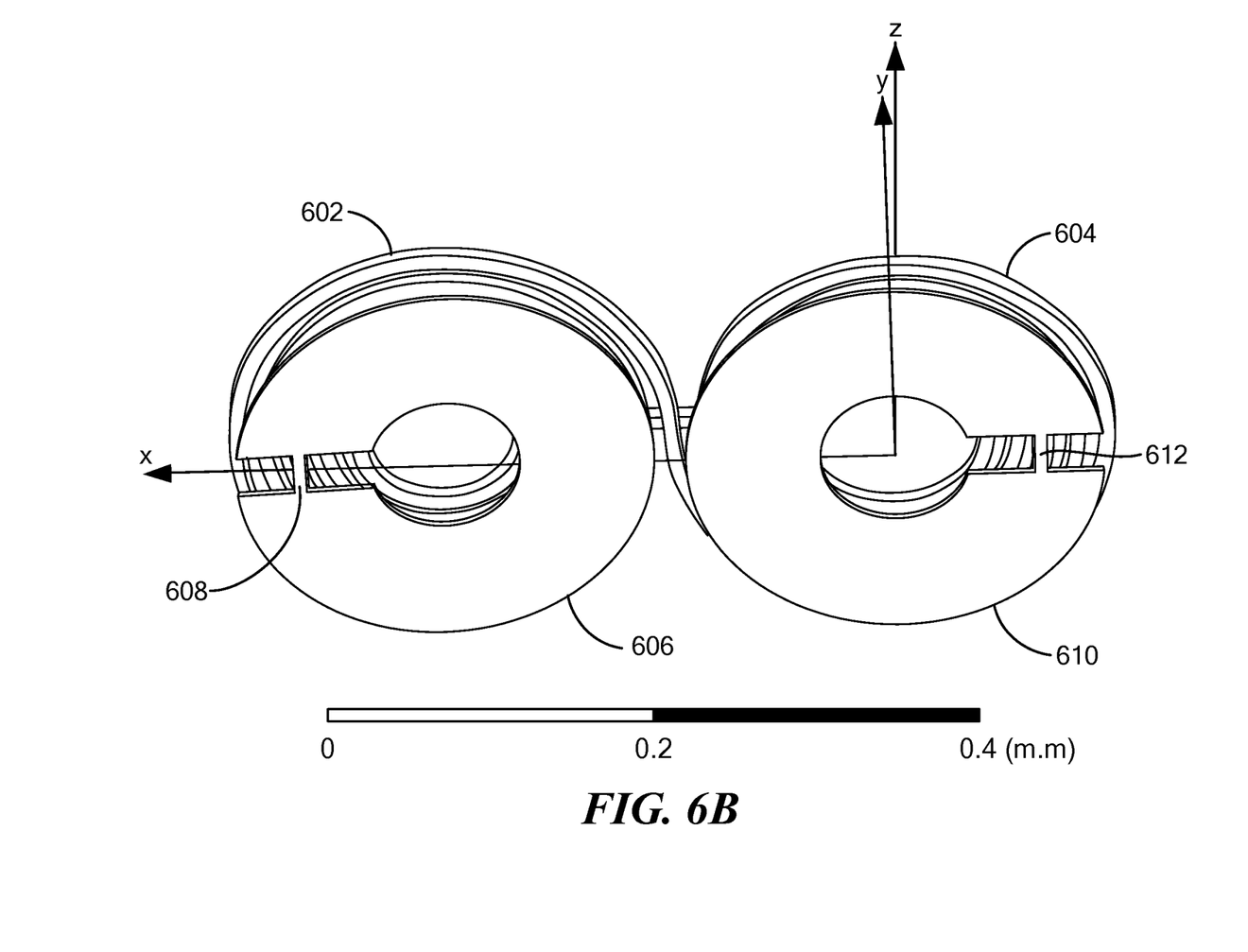

FIGS. 6A and 6B show first and second coils 602, 604 coupled in series and wound in opposite directions to reject stray fields. A third coil 606 with a narrowed region 608 is aligned and isolated from the first coil 602, and a fourth coil 610 with a narrowed region 612 is aligned and isolated from the second coil. With this configuration, stray fields in the x or y plane are rejected by using a differential configuration for the magnetic field sensor. Stray fields in the z plane may couple into the system, as well as in embodiments described above. The illustrative two-coil configuration sends signals differentially across the voltage barrier rejecting stray fields in the z plane. This results in less radiated fields from the coils, which decreases radiated emissions as well as channel cross-talk. It is understood that stray fields in z can create current in a closed coil, which may be picked up in embodiments described above. In the embodiments of FIGS. 6A and 6B, this current may show up in both pick-up coils and be rejected by the differential configuration.

An example embodiment of FIGS. 6A and 6B was found to have a coupling factor of around 0.5 G/mA at 200 MHz (field on sensor per mA in the top coil). If one were to just place magnetic sensors under the first coil, the coupling is around 0.17 G/mA, which achieves about 3 times more efficiency.

In embodiments, the second coil 604 can be grounded to effectively shield the magnetic sensors. This configuration can have a significant impact on power consumption, as the signals being sent across the barrier may be based on the size of disturbances that can occur due to capacitance from one side to the other. In embodiments, a shield between the coil and the magnetic sensors can be added.

Figure 7:
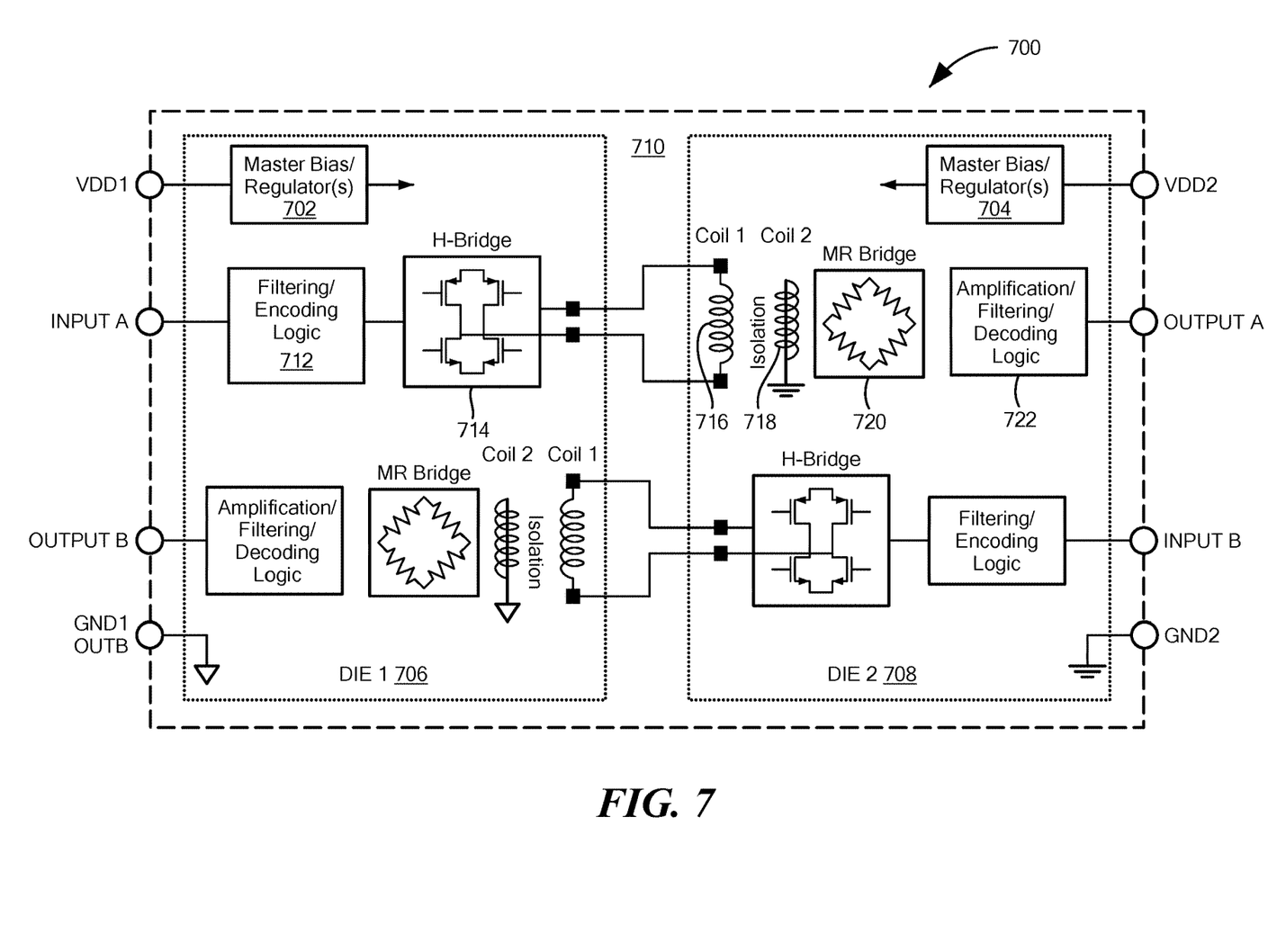
FIG. 7 is a schematic representation of a signal isolator IC package embodiment having magnetic data transfer.

FIG. 7 shows an example signal isolator IC package 700 having coil-to-coil-to-sensor data transfer. A first supply voltage can be coupled to a first supply pin VDD1 and a second supply voltage can be coupled to a second supply pin VDD2. The supply voltages can power respective master bias/regulators 702, 704 for supplying various sub-circuits on the IC.

The IC 700 includes a first die 706 separated from a second die 708 by a voltage barrier 710 across which signals are transferred. A first input pin INPUT A receives a first input signal that is processed by a filtering/encoding module 712 which is coupled to a transistor bridge 714. A first coil 716 is located on the second die 708 for receiving the signal from the transistor bridge 714 on the first die. A second coil 718 is coupled to the first coil 716 and a first magnetic field sensing element 720 is located proximate the second coil 718 to detect signals on the second coil. In an illustrative embodiment, the first magnetic field sensing element 720 comprises a MR bridge. A processing module 722 can amplify, filter, and/or decode the signal from the sensing element 720. The processed signal is sent to a first output pin OUTPUT A for providing an external connection. A similar path can be provided from INPUT B to OUTPUT B.

In embodiments, the first coil 716, second coil 717, and first magnetic field sensing element 720 can be provided as shown in FIG. 2A, FIG. 3A, FIG. 6A, or alternative configuration, as shown and described above.

Figure 8:
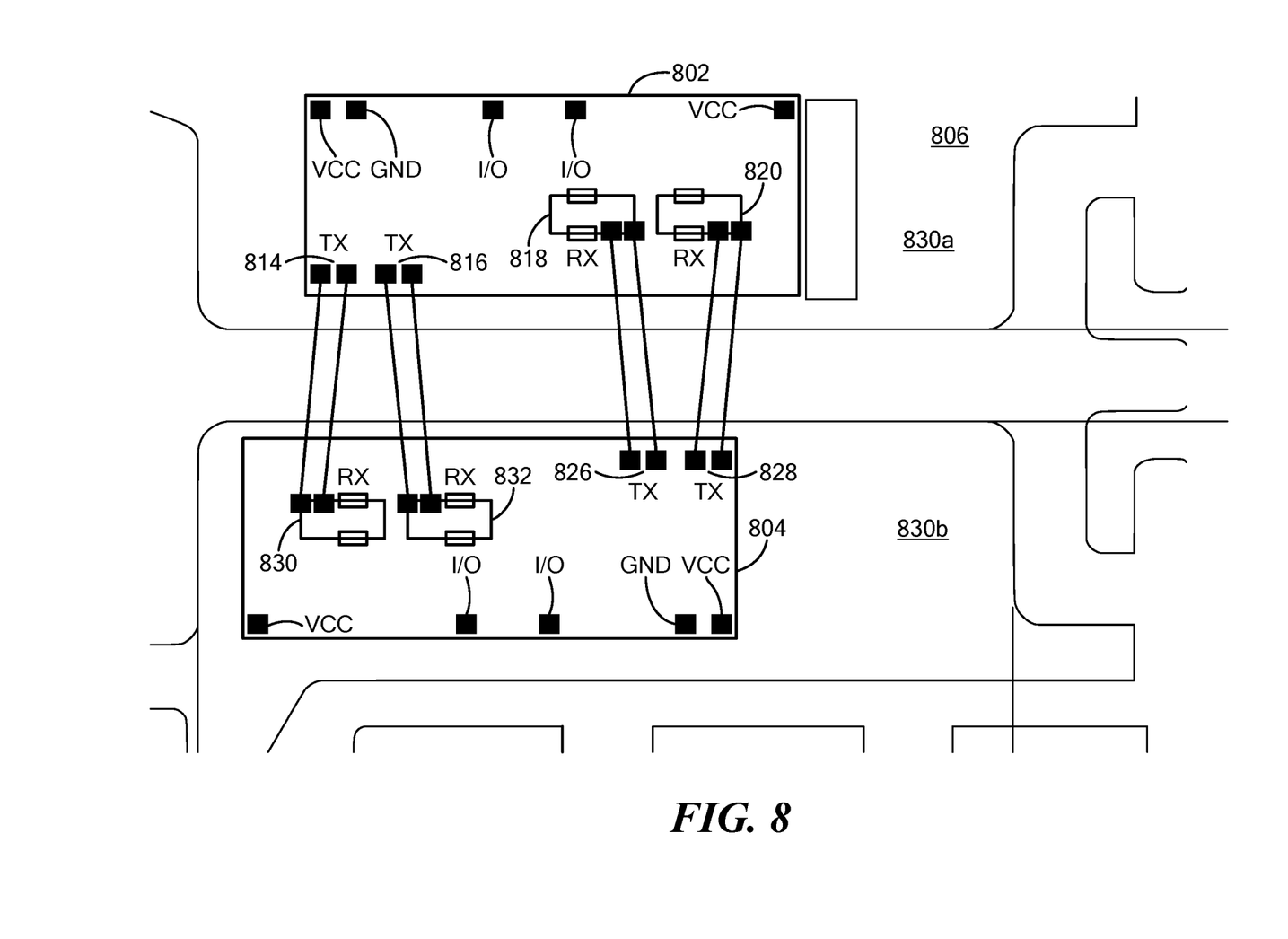
FIG. 8 is a schematic representation of a signal isolator having magnetic data transfer with matching first and second die.

FIG. 8 shows an example implementation of a signal isolator IC 806 having coil-to-coil data transfer in which the first die 802 and the second die 804 are substantially identical and rotated 180 degrees in order to facilitate connections between the transmitters 814, 816 of the first die 802 and the receivers 830, 832 of the second die 804, as well as transmitters 826, 828 of the second die 804 and receivers 818, 820 of the first die 802. As can be seen, if the second die 804 is rotated 180 degrees, the pinout (VCC, GND I/Os, VCC) of the IC 806 and transmit and receive modules will line up so as to facilitate a series of relatively direct connections, such as wirebonds, between the first and second dies 802, 804. While the first and second die 802, 804 may be identical and rotated 180 degrees from each other, with the correct designation of transmit and receive channels, one can achieve a desired transfer of information to each die with connections nearly straight across the barrier between the dies.

In embodiments, the IC 806 can include a split die paddle in which a leadframe includes a first portion 830a on which the first die 802 is disposed and a second portion 830b on which the second die 804 is disposed. It will be appreciated that the first and second portions 830a,b of the leadframe isolates the first and second dies 102, 104. In embodiments, the first and second portions of the leadframe 830a,b are physically and electrically isolated. In embodiments, separate voltage supply signals and ground connections can be provided to each of the first and second dies 802, 804 of the IC 806 to promote isolation.

With this arrangement, digital signals can be provided as inputs to the IC 806 which can generate digital output signals that are isolated to enable systems to communicate with each other via the IC, for example. It is understood that the ground potential connections to the first and second dies can vary by hundreds of volts, for example. Isolation can be provided by capacitive, inductive, and/or coil to magnetic sensing elements for transferring information across the barrier.

As used herein, the term "magnetic field sensing element" is used to describe a variety of electronic elements that can sense a magnetic field. The magnetic field sensing element can comprise, but is not limited to, a Hall Effect element, a magnetoresistance element, and/or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, a magnetic tunnel junction (MTJ), and a spin-valve. The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 9:
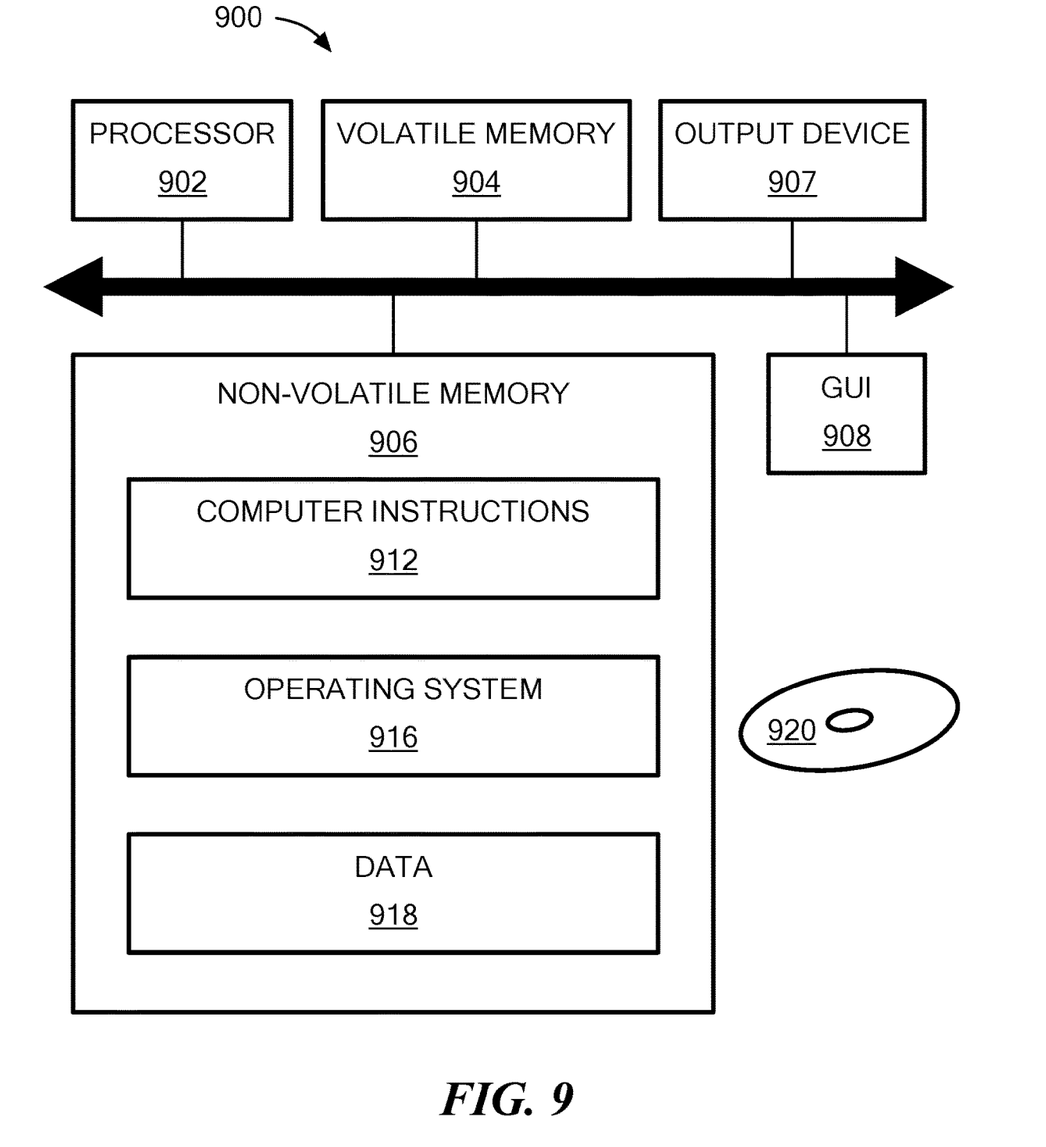
FIG. 9 is an example computer that can perform at least a portion of the processing described herein.

FIG. 9 shows an exemplary computer 900 that can perform at least part of the processing described herein. The computer 900 includes a processor 902, a volatile memory 904, a non-volatile memory 906 (e.g., hard disk), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination.

What is claimed is:

1. A system, comprising:
a drive coil to transmit information;
a receive coil magnetically coupled to the drive coil for receiving the information from the drive coil; and
a first magnetic field sensing element proximate the receive coil to detect the information from the receive coil, wherein the receive coil includes a first narrowed portion for concentrating magnetic field generated by the current through the receive coil on the first magnetic field sensing element.

2. The system according to claim 1, further including a second magnetic field sensing element, wherein the receive coil includes a second narrowed portion, wherein the second magnetic field sensing element is proximate the second narrowed portion.

3. The system according to claim 2, wherein the first and second narrowed regions are located for coupling to the first and second magnetic field sensing elements differentially, which has a bridge configuration.

4. The system according to claim 1, wherein the first narrowed portion is located outside of an area of the drive coil.

5. The system according to claim 1, further including a die to support the first magnetic field sensing element.

6. The system according to claim 5, wherein the die supports the drive and receive coils.

7. The system according to claim 5, wherein the die incudes circuitry to process information from the first magnetic field sensing element.

8. The system according to claim 1, wherein the receive coil has one turn.

9. The system according to claim 1, wherein the receive coil has less than five turns.

10. The system according to claim 1, wherein the drive coil includes first and second coils coupled in series.

11. The system according to claim 1, wherein the receive coil is connected to ground.

12. The system according to claim 1, wherein the first magnetic field sensing element comprises a GMR element.

13. The system according to claim 1, wherein the first magnetic field sensing element comprises a TMR element.

14. The system according to claim 1, wherein the drive coil is isolated from the receive coil and the magnetic field sensing element.

15. The system according to claim 14, wherein the isolation comprises electrical and/or galvanic isolation.

16. A signal isolator IC package, comprising:
a drive coil to transmit information;
a receive coil magnetically coupled to the drive coil for receiving the information from the drive coil; and
a first magnetic field sensing element proximate the receive coil to detect the information from the receive coil,
wherein the receive coil includes a first narrowed portion for concentrating magnetic field generated by the current through the receive coil on the first magnetic field sensing element.

17. The IC package according to claim 16, further including isolation between the drive coil and receive coil.

18. The IC package according to claim 16, further including a second magnetic field sensing element, wherein the receive coil includes a second narrowed portion, wherein the second magnetic field sensing element is proximate the second narrowed portion.

19. The IC package according to claim 18, wherein the first and second narrowed portions are located for coupling to the first magnetic field sensing element, which has a bridge configuration.

20. The IC package according to claim 16, wherein the first narrowed portion is located outside of an area of the drive coil.

21. The IC package according to claim 16, further including a die to support the first magnetic field sensing element.

22. The IC package according to claim 16, further including a transistor bridge coupled to the drive coil.

23. The IC package according to claim 16, further including first and second die separated by a barrier region.

24. The IC package according to claim 23, wherein the transistor bridge is disposed on the first die and the drive and receive coils are disposed on the second die.

25. The IC package according to claim 24, wherein the first magnetic field sensing element sensor is disposed on the second die.

26. The IC package according to claim 22, wherein the transistor bridge is coupled to a first input pin and the first magnetic field sensing element is coupled to a first output pin.

27. A method, comprising:
employing a drive coil to transmit information;
employing a receive coil magnetically coupled to the drive coil for receiving the information from the drive coil; and
employing a first magnetic field sensing element proximate the receive coil to detect the information from the receive coil,
wherein the receive coil includes a first narrowed portion for concentrating magnetic field generated by the current through the receive coil on the first magnetic field sensing element.

28. The method according to claim 27, further including employing a second magnetic field sensing element, wherein the receive coil includes a second narrowed portion, wherein the second magnetic field sensing element is proximate the second narrowed portion.

29. The method according to claim 28, wherein the first and second narrowed portions are located for coupling to the first and second magnetic field sensing elements differentially, which has a bridge configuration.

* * * * *

UNITED STATES PATENT AND TRADEMARK OFFICE
CERTIFICATE OF CORRECTION

PATENT NO. : 11,115,084 B2
APPLICATION NO. : 16/200799
DATED : September 7, 2021
INVENTOR(S) : Alexander Latham et al.

It is certified that error appears in the above-identified patent and that said Letters Patent is hereby corrected as shown below:

On the Title Page

Item [57], Line 7, delete "packages" and replace with --package--.

In the Specification

Column 3, Line 56, delete "104 a" and replace with --104 via a--.

Column 3, Line 63, delete "transmit" and replace with --transmits--.

Column 4, Lines 17-18, delete "coil grounded" and replace with --coil is grounded--.

Column 5, Line 11, delete "though" and replace with --through--.

Column 5, Line 13, delete "field reduce" and replace with --field and reduce--.

Signed and Sealed this
Fifteenth Day of November, 2022

Katherine Kelly Vidal
*Director of the United States Patent and Trademark Office*